Feb. 10, 1948.   F. E. CREVER ET AL   2,435,819
AIRCRAFT CABIN PRESSURE CONTROL ARRANGEMENT
Filed March 20, 1944

Inventors:
Frederick E. Crever,
Lawrence A. Burton,
by Harry E. Dunham
Their Attorney.

Patented Feb. 10, 1948

2,435,819

UNITED STATES PATENT OFFICE 2,435,819

AIRCRAFT CABIN PRESSURE CONTROL ARRANGEMENT

Frederick E. Crever, Scotia, and Lawrence A. Burton, Schenectady, N. Y., assignors to General Electric Company, a corporation of New York Application March 20, 1944, Serial No. 527,180

4 Claims. (Cl. 98—1.5)

1

The present invention relates to aircraft cabin pressure control arrangements for maintaining certain predetermined cabin pressure conditions upon changes in atmospheric or altitude pressure. In aircraft cabins it is often desirable to maintain a pressure bearing a definite ratio to the atmospheric pressure as the craft climbs above a certain altitude. The maintenance of such constant pressure ratio has two purposes: first, it prevents excess pressure drop across the cabin walls, thus precluding bursting thereof, and second, it assures stable operation of a compressor or supercharger for supplying compressed air to the cabin. Below said altitude it is often desirable to maintain the cabin pressure constant upon changes in altitude pressure.

The object of our invention is to provide an improved construction of aircraft cabin pressure control arrangements whereby the cabin pressure may be effectively controlled by means of a comparatively simple, reliable and safe mechanism.

For a consideration of what we believe to be novel and our invention, attention is directed to the following description and the claims appended thereto in connection with the accompanying drawing.

Figure 1:
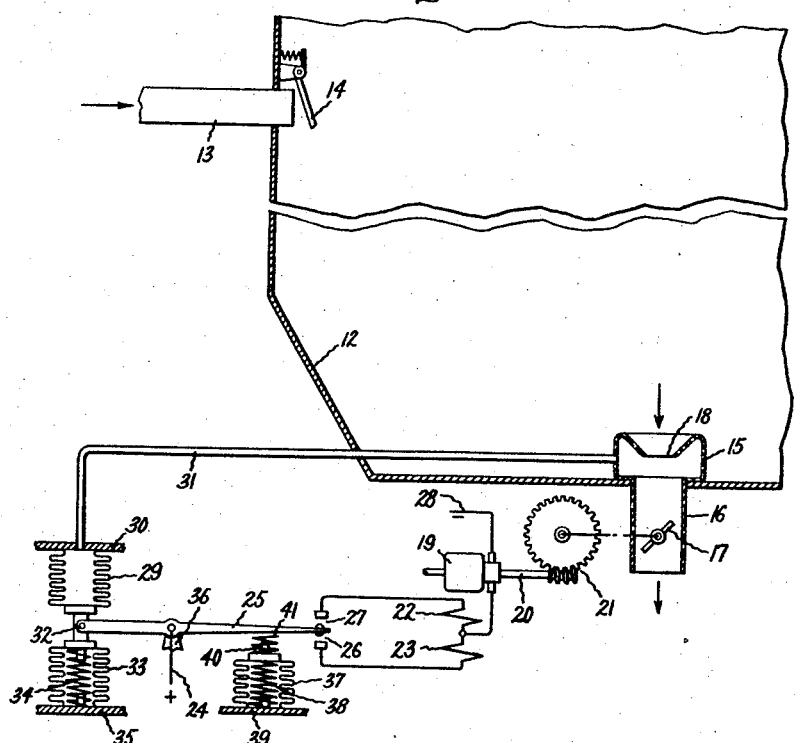
Figure 2:
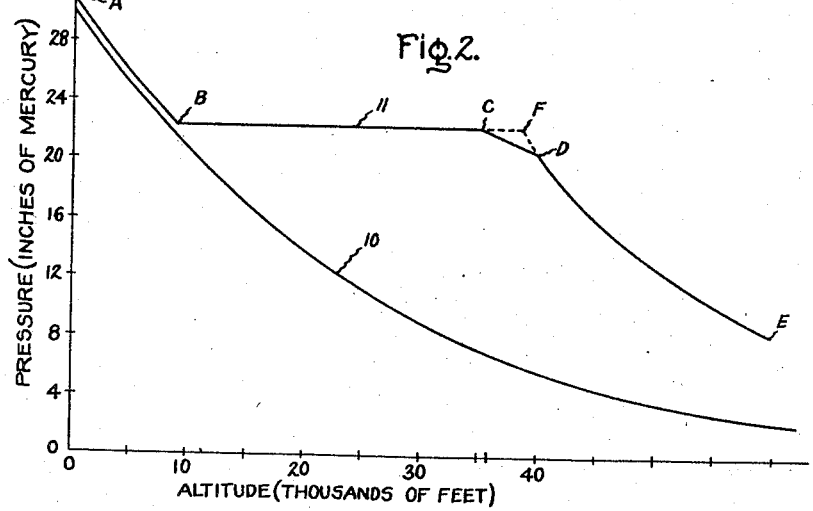

Fig. 1 of the drawing illustrates an arrangement embodying our invention, and Fig. 2 illustrates certain operating characteristics of the arrangement of Fig. 1.

The curve 10 in Fig. 2 illustrates the atmospheric pressure in inches of mercury for different altitudes. Curve 11 illustrates the cabin pressure over altitude maintained by a pressure control arrangement as shown in Fig. 1. From point A to B of curve 11 the cabin pressure is slightly higher than the corresponding altitude pressure due to the supply of a small amount of compressed air to the cabin to assure ventilation thereof. This is not always the case and for practical purposes the cabin pressure is equal to the altitude pressure up to a certain altitude, in the present instance about 10,000 feet. Within a certain altitude range from point B to point C of the curve 11 a constant pressure is maintained in the cabin. At a higher altitude range, from point D to point E the ratio of the cabin pressure to the atmospheric pressure is maintained substantially constant. The portions B, C and D, E of the curve 11 are extended by dotted lines. They intersect at a point F. The provision of special means in our control arrangement precludes a sudden change of pressure along the lines CFD and causes a gradual change along the

2 line CD, that is, a gradual change from constant pressure control to constant pressure ratio control. The part CD of the curve 11 is substantially parallel to the corresponding portion of the atmospheric pressure curve 10. In other words, from point C to point D a substantially constant pressure differential is maintained between the cabin pressure and the altitude pressure. In the present example constant ratio between cabin and atmospheric pressure is maintained at altitudes above 40,000 feet.

An arrangement for attaining the pressure altitude characteristic 11 is shown in Fig. 1 and comprises a cabin or like compartment or chamber 12 to be supercharged or pressurized. Air under pressure is supplied to the cabin 12 by a conduit 13. A spring-biased butterfly valve 14 is associated with the outlet of the conduit 13 in the cabin 12 and kept open against the biasing force of a spring by the flow of compressed air discharged from the conduit 13 into the cabin. Air is discharged from the cabin in accordance with our invention by means of a muffler or conduit which in the present example has a portion 15 located inside the cabin and another portion 16 located outside the cabin and including a butterfly valve 17 for controlling the flow of air discharged from the cabin. The portion 16 has a slight restriction 18 of an area somewhat smaller than the area of the conduit portion 16 for receiving air from the cabin. The valve 17 is positioned by a motor, in the present instance a reversing or split field series motor 19, having a shaft 20 connected to the valve 17 through a suitable reducing gear 21. The motor 19 has two field windings 22 and 23. The circuit for the motor includes a conductor 24, conducting means along the lever 25, two pairs of contacts 26, 27 and a conductor 28. Upon closing of the contacts 26 a circuit is formed from an electric D. C. source through the conductor 24, the lever 25, contacts 26, field 23, the armature, to the conductor 28. In this instance the motor is rotated in a direction to cause closing of the valve 17. Upon closing of the contacts 27 a similar circuit is formed through the other field winding 22 to effect rotation of the motor 19 in a direction to cause opening of the valve 17 thereby decreasing the pressure drop across the valve 17 in order to reduce the pressure in the cabin.

The position of the lever 25 is controlled in response to certain pressure changes by means of pressure responsive devices. These devices include a bellows 29 secured at its upper end to a fixed support 30 and connected by a pipe 31 to the part 15 of the muffler, that is, connected to the muffler or conduit at a point between the restriction 18 and the valve 17. The lower end of the bellows 29 is connected by a pivot 32 to the left-hand end of the lever 25. Another bellows 33 evacuated, including a compression spring 34 is connected at its upper end to the pivot 32 and held at its lower end on a fixed support 35. The bellows 29 and 33 have the same areas. Hence, together they constitute a device responsive to changes of the absolute pressure in the muffler. An intermediate point of the lever 25 is supported on a fulcrum 36. Another bellows 37 is associated with the right-hand portion of the lever 25. The bellows 37 is evacuated like the bellows 33 and also includes a compression spring 38. The lower end of the bellows 37 is secured to a fixed support 39. The upper end is cooperatively associated with the lever 25 and includes a pin 40 together with a spring 41 surrounding the pin and in uncompressed condition (as shown), projecting beyond the pin 40.

The operation of the control arrangement is as follows: Up to a certain altitude indicated by the point C on curve 11, Fig. 2, the bellows 38 is inoperative, that is its upper end, more particularly the upper end of the spring 41, is spaced from or does not exert any force on the lever 25. The valve 17 therefore is controlled solely by the absolute pressure responsive device 29, 33 which functions to maintain constant pressure in the cabin. Upon an increase in pressure the bellows 29 expands, causing counterclockwise turning movement of the lever 25 about the fulcrum 26 to close the contacts 27 which, as pointed out above, causes rotation of the motor to effect opening of the valve 17. As soon as the valve 17 opens, the pressure in the muffler or conduit 15, 16 drops. This drop in turn is transmitted to the bellows 29. Thus, the provision of the muffler 15 assures sensitive pressure control and precludes hunting or over-control of the mechanism. Any movement of the valve 17 is almost instantaneously transmitted to effect a corresponding change, expansion or collapse of the bellows 29.

Upon a decrease in pressure in the cabin 12 and accordingly the muffler 15, 16 the bellows 29 collapses and causes clockwise turning movement of the lever 25 to close the contacts 26 and effect rotation of the motor 19 in a direction to close the valve 17. As soon as the valve 17 starts to close, the pressure in the muffler rises, which rise is transmitted to the bellows 29 to restore the lever 25 to its normal or mid position between the contacts 26, 27.

With increasing altitude the bellows 37 which is responsive to atmospheric pressure expands. At a certain altitude indicated by point C, Fig. 2, the spring 41 engages the lever 25 and moves it upward to close contact 27, thereby effecting a drop in pressure indicated by part C, D of curve 11 as the altitude increases from C to D, Fig. 2. At the altitude represented by point D the spring 41 is compressed an amount at which the solid pin 40 comes into direct engagement with the lever 25. Thereafter the valve 17 is controlled in response to changes of the ratio of cabin pressure and altitude pressure to maintain such ratio constant. In the present instance this ratio is equal to the ratio $$\frac{A_{37} \times L_{37}}{A_{29} L_{29}}$$

in which $A_{29}$ and $A_{37}$ are the areas of bellows 29 and 37, respectively, and $L_{29}$ and $L_{37}$ are the lever arms of bellows 29 and 37, respectively. This ratio applies when the solid pin 40 engages the lever 25 by properly selecting the spring forces, the bellows areas and the lever arms, any desired constant ratio may be obtained. In the present example the spring forces have been made equal so as to cancel out.

Thus, with our invention we have accomplished an improved construction for aircraft cabin pressure control arrangements. Broadly, a mechanism according to our invention includes means for controlling the discharge of air from a cabin to maintain the pressure therein constant up to a preselected altitude. This means comprises a conduit for discharging air from the cabin, which conduit has a restriction for receiving air from the cabin and a valve for controlling the flow through the restriction and located beyond the restriction as regards the direction of flow of air through the conduit. An absolute pressure responsive device is connected to the conduit at a point between the restriction and the valve to move a lever in response to pressure changes. Movement of the lever is transferred to the valve by an electrical motor. In addition the mechanism includes a second device responsive to changes of the atmospheric or altitude pressure and cooperatively associated with the lever. Up to a certain altitude the second device is disconnected from the lever or, from another viewpoint, it has a loose or lost motion connection therewith. At a predetermined altitude a spring means associated with the second device engages the lever, thus forming a yielding or flexible connection therewith. At a preselected higher altitude a pin or like solid element secured to the device engages the lever and thus forms a solid engagement or connection between the lever and the device. Above the altitude at which solid engagement takes place the control mechanism maintains constant ratio between cabin and altitude pressure upon changes of either.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent in the United States is:

1. The combination of an aircraft cabin, means for conducting compressed air to the cabin, a conduit including a valve for discharging compressed air from the cabin, and a control mechanism for positioning said valve comprising a lever, a support for said lever, an absolute pressure responsive device connected to the lever on one side of said support and including a bellows communicating with the cabin to maintain a substantially constant cabin pressure within a predetermined range of altitude, means to maintain a substantially constant pressure ratio at a higher altitude range comprising a device responsive to changes in atmospheric pressure cooperatively associated with the lever at the other side of said support and adapted to engage said lever during operation within said other altitude range, and means to effect gradual transition from constant pressure to constant pressure ratio control between said two altitude ranges, said last mentioned means including a spring for yieldingly connecting said atmospheric pressure responsive device to the lever during operation between said two altitude ranges.

2. The combination of an aircraft cabin, means for conducting compressed air to the cabin, a conduit including a valve and a restriction ahead of the valve as regards the flow therethrough for discharging air from the cabin, and a mechanism for controlling the valve comprising a lever, a support for said lever, an absolute pressure responsive device pivotally connected to the lever on one side of said support and including a first bellows communicating with the conduit at a point between the restriction and the valve, an evacuated bellows responsive to atmospheric pressure, spring means for yieldingly connecting said evacuated bellows to the lever at a predetermined altitude, pin means for solidly connecting said evacuated bellows to the lever at a predetermined higher altitude and a split field series motor mechanically connected to the valve and having a circuit controlled by the lever.

3. Aircraft cabin pressure control arrangement comprising a muffler having a restriction for receiving air from a cabin, a valve in the muffler located beyond the restriction as regards the direction of flow therethrough, and a mechanism for controlling the valve comprising a lever, an absolute pressure responsive device comprising a first bellows communicating with the muffler at a point between the restriction and the valve and an evacuated bellows, means connecting each of said bellows pivotally to said lever, an atmospheric pressure responsive device, and spring means yieldingly connecting the last mentioned device to the lever at a predetermined altitude and for solidly connecting the device to the lever at a higher predetermined altitude.

4. Pressure control arrangement for positioning an outlet valve in an aircraft cabin in response to changes in cabin pressure comprising a lever, a first pressure responsive device pivotally connected to the lever, said device further comprising a bellows having an opening adapted to communicate with said aircraft cabin, an evacuated bellows having one end fixed and having its other end connected to said first pressure responsive device, a second pressure responsive device subject to changes in atmospheric pressure, a support for said lever located at a point intermediate said first and said second device, means for yieldingly connecting said second device to the lever at a predetermined altitude, other means for solidly connecting the second device to the lever at a higher predetermined altitude, and motor means controlled by said lever for positioning said valve.

FREDERICK E. CREVER.
LAWRENCE A. BURTON.

REFERENCES CITED

The following references are of record in the file of this patent:

UNITED STATES PATENTS

| Number | Name | Date |
|---|---|---|
| 1,511,489 | Armstrong | Oct. 14, 1924 |
| 2,208,554 | Price | July 16, 1940 |
| 2,396,116 | Moxon | Mar. 5, 1946 |
| 2,407,258 | Del Mar | Sept. 10, 1946 |
| 2,419,707 | Cooper et al. | Apr. 29, 1947 |

FOREIGN PATENTS

| Number | Country | Date |
|---|---|---|
| 521,623 | Great Britain | May 27, 1940 |